United States Patent
Shuang et al.

(10) Patent No.: US 11,254,598 B2
(45) Date of Patent: Feb. 22, 2022

(54) METHOD FOR PROMOTING DENITRIFICATION TO REMOVE NITRATE NITROGEN IN WATER BY MAGNETIC RESINS

(71) Applicants: NANJING UNIVERSITY, Jiangsu (CN); NANJING UNIVERSITY & YANCHENG ACADEMY OF ENVIRONMENTAL PROTECTION TECHNOLOGY AND ENGINEERING, Jiangsu (CN)

(72) Inventors: Chendong Shuang, Nanjing (CN); Guang Zhang, Nanjing (CN); Ting Ye, Nanjing (CN); Aimin Li, Nanjing (CN); Liang Tan, Nanjing (CN); Ke Wang, Nanjing (CN)

(73) Assignees: NANJING UNIVERSITY, Nanjing (CN); NANJING UNIVERSITY & YANCHENG ACADEMY OF ENVIRONMENTAL PROTECTION TECHNOLOGY AND ENGINEERING, Yancheng (CN)

( * ) Notice: Subject to any disclaimer, the term of this patent is extended or adjusted under 35 U.S.C. 154(b) by 40 days.

(21) Appl. No.: 16/764,847

(22) PCT Filed: Apr. 20, 2018

(86) PCT No.: PCT/CN2018/083896
§ 371 (c)(1),
(2) Date: May 16, 2020

(87) PCT Pub. No.: WO2019/095629
PCT Pub. Date: May 23, 2019

(65) Prior Publication Data
US 2020/0339459 A1 Oct. 29, 2020

(30) Foreign Application Priority Data

Nov. 17, 2017 (CN) .......................... 201711146955.8

(51) Int. Cl.
*C02F 9/00* (2006.01)
*C02F 1/42* (2006.01)
(Continued)

(52) U.S. Cl.
CPC .................. *C02F 9/00* (2013.01); *C02F 1/42* (2013.01); *C02F 1/488* (2013.01); *C02F 3/305* (2013.01);
(Continued)

(58) Field of Classification Search
None
See application file for complete search history.

(56) References Cited

U.S. PATENT DOCUMENTS

| 4,454,038 A * | 6/1984 | Shimodaira | C12M 47/12 210/150 |
| 2002/0185437 A1* | 12/2002 | Haridas | C02F 3/06 210/617 |
| 2014/0235428 A1* | 8/2014 | Pan | B01J 31/08 502/11 |

FOREIGN PATENT DOCUMENTS

| CN | 101254976 A * | 9/2008 |
| CN | 102430433 A * | 5/2012 |

(Continued)

OTHER PUBLICATIONS

Jung, J., et al., "Nitrate reduction by maghemite supported Cu—Pd bimetallic catalyst," Applied Catalysis B: Environmental, 2012, vol. 127, pp. 148-158. (Year: 2012).*

*Primary Examiner* — Chester T Barry
(74) *Attorney, Agent, or Firm* — CBM Patent Consulting, LLC

(57) ABSTRACT

In view of the current pollution to sewage by nitrate nitrogen, the present invention discloses a method for promoting
(Continued)

denitrification to remove nitrate nitrogen in water by magnetic resins. In the method disclosed by the present invention, magnetic anion exchange resins are in contact with and mixed with sewage, and nitrate nitrogen in the sewage is removed quickly and efficiently by both the ion exchange between the magnetic anion exchange resins and the nitrate nitrogen in the sewage and the denitrification enhanced by the magnetic material. Meanwhile, the regeneration and recycle of the magnetic anion exchange resins are realized by the denitrification of microorganisms.

8 Claims, 1 Drawing Sheet

(51) Int. Cl.
  *C02F 1/48* (2006.01)
  *C02F 3/30* (2006.01)
  *C02F 101/16* (2006.01)
(52) U.S. Cl.
  CPC .. *C02F 2001/422* (2013.01); *C02F 2101/163* (2013.01); *C02F 2303/16* (2013.01)

(56) References Cited

FOREIGN PATENT DOCUMENTS

| | | | |
|---|---|---|---|
| CN | 106892543 A | * | 6/2017 |
| JP | 10192878 A | * | 7/1998 |

* cited by examiner

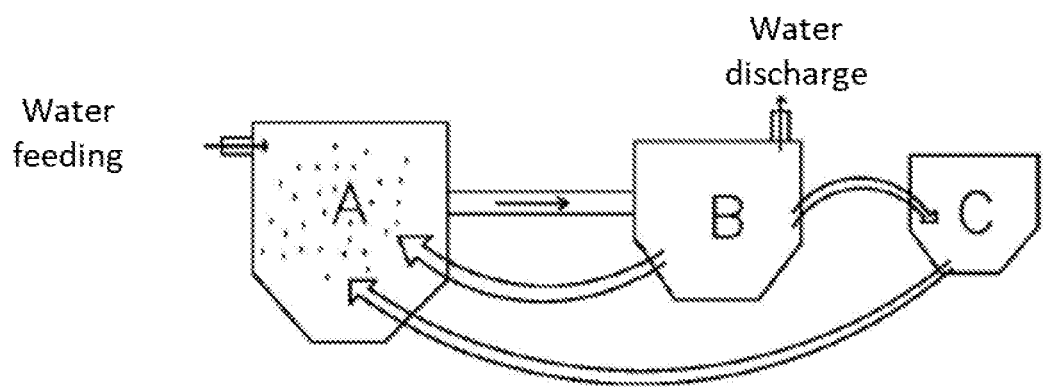

METHOD FOR PROMOTING DENITRIFICATION TO REMOVE NITRATE NITROGEN IN WATER BY MAGNETIC RESINS

TECHNICAL FIELD OF THE INVENTION

The present invention relates to a method for promoting denitrification to remove nitrate nitrogen in water by magnetic resins, and in particular to a method for efficiently removing nitrate nitrogen in water or sewage by the ion exchange effect of ion exchange groups of magnetic resins and the biological effect enhanced by the magnetic material.

BACKGROUND OF THE INVENTION

Nitrate nitrogen extensively exits in various bodies of water in the natural world. With the rapid development of China's industry and agriculture and the frequent production activities of human beings, nitrate nitrogen in industrial wastewater, rural sewage and urban sewage is constantly discharged into the natural world. The concentration of nitrate nitrogen in water in the natural world increases sharply. Both surface water and underground water are seriously polluted by nitrate nitrogen, and the presence of nitrate nitrogen in drinking water is endangering people's health.

Recently, the increasing concentration of nitrate nitrogen in various bodies of water has become one of the most concerned pollutant indicators in water. In China, the discharge limit of total nitrogen in pollutants in urban sewage is set to be 15 mg/L (the first-class A standard in pollutant discharge standards for urban sewage treatment plants) as the maximum allowable discharge concentration (GB18918-2002), and the discharge limit of total nitrogen in drained water in areas with prominent water eutrophication is even set to be 10 mg/L.

Common methods for treating nitrate nitrogen in water include biological treatment, reverse osmosis, anion resin exchange, chemical catalytic reduction, electrodialysis, etc. Considering the technical maturity, operational effectiveness and cost, biological treatment methods are more commonly used at present. As one of conventional biological treatment methods, denitrification is widely used in sewage treatment plants due to its low operating cost. However, the denitrification effect is greatly affected by temperature, and it is difficult to ensure efficient and stable denitrification in some seasons and in northern areas. The Environmental Protection Agency (EPA) has proposed an anion exchange method to remove nitrate nitrogen in the underground water. This method is highly effective in removal of nitrate nitrogen and stable in water discharge. However, this method requires high-concentration saline water to regenerate resins, and it is difficult to treat the resulting high-salt desorption liquid. Therefore, it is still difficult to popularize the ion exchange method in the sewage treatment. In view of the deficiencies of the removal of nitrate nitrogen by anion exchange resins, Chinese Patent 201510571917.1 disclosed a method for removing nitrate nitrogen in water by both ion exchange and denitrification. In this method, nitrate nitrogen in water is removed by anion exchange resins, and the anion exchange resins adsorbed with nitrate is transferred and then regenerated by denitrification, so that the anion exchange resins are recycled. In this method, nitrate nitrogen can be efficiently concentrated by the resins and then removed biologically. However, there is a risk of polluting the resins by biological substances. Chinese Patent Application 201710296407.7 disclosed a method for deeply removing high-concentration nitrate nitrogen in wastewater. In this method, by combining the preliminary elimination of nitrate nitrogen in the wastewater by denitrification deep-bed filtration with the efficient and deep removal of nitrate nitrogen in the wastewater by adsorption by using magnetic ion exchange resins, both of which methods are somewhat resistant to low temperature, a cold-resistant method for economically, efficiently and deeply removing high-concentration nitrate nitrogen in wastewater is provided. In this method, although the high-concentration nitrate nitrogen in wastewater can be removed, the wastewater having a high concentration of nitrate nitrogen is difficultly treated due to frequent regeneration of the resins, and the regeneration liquid is also wastewater having a high concentration of nitrate nitrogen and needs to be further treated. Therefore, it is relatively complicated to remove high-concentration nitrate nitrogen in wastewater by this method.

SUMMARY OF THE INVENTION

A technical problem to be solved by the present invention is to provide a method for promoting denitrification to remove nitrate nitrogen in water by magnetic resins, to efficiently remove total nitrogen in water or sewage and further reduce cost.

To solve the technical problem, the present invention employs the following technical solutions.

A method for promoting denitrification to remove nitrate nitrogen in water by magnetic resins is provided, including the following steps of:

(1) adsorption using magnetic resins: feeding water containing nitrate nitrogen into a pool A, mixing the water with the magnetic resins in the pool A, and removing nitrate nitrogen in the water by controlling the flow ratio of the magnetic resins to the water and the adsorption time, the adsorption time being 5 to 60 min;

(2) separation: passing the water from the pool A into a reactor B where the magnetic resins are separated from the water by hydrocyclone separation, returning 0% to 70% of the separated magnetic resins to the pool A, and putting the remaining magnetic resins into a denitrification reactor C;

(3) denitrification: adding electron donors in the reactor C, retaining the magnetic resins in the pool C for 0.5 h to 8 h, and maintaining the temperature within 15° C. to 38° C.; and (4) resin recycling: returning the magnetic resins on the bottom of the pool C to the pool A for recycling by natural deposition.

In the step (1), the flow ratio of the magnetic resins to the water is 1:3-200.

In the step (1), the magnetic resins are nanoscale/microscale $Fe_3O_4$-supported strong base anion exchange resins, nanoscale/microscale $Fe_2O_3$-supported strong base anion exchange resins or magnetic strong base anion exchange resins prepared by copolymerization.

In the step (3), the electron donor is one or more of methanol, sodium acetate, glucose, starch, lactic acid, lactate, sulfur, divalent iron salt and ferrous sulfide.

One or more of activated sludge, denitrifying bacteria and anaerobic sludge is added in the reactor C.

The activated sludge, the denitrifying bacteria or the anaerobic sludge is added in the reactor C in such an amount that the content of volatile solids in the solution is 0.1 to 20 g/L.

In the step (3), the electron donors are added in the reactor C in such an amount that the C/N ratio in the solution is 5.5 to 7.5 to ensure a sufficient carbon source during reaction.

In the step (3), the magnetic resins are retained for 1 h in the pool C, and the temperature is maintained at 30° C.

Specifically, the present invention has the following advantages.

(1) Denitrifying microorganisms adhere to the surface of the magnetic resins, and the metabolism of the microorganisms can be promoted by the magnetic material. Therefore, during the normal operation, both the ion exchange and the denitrification enhanced by the magnetic material occur in the pool A and the reactor B, so that the retention time is shortened, the volume of the reactor is decreased and the removal of nitrate nitrogen is improved.

(2) By using a hydrocyclone (reactor B) and a reactor for denitrifying the separated resins (reactor C), the space for the conventional denitrification process can be greatly reduced, and the investment cost can thus be significantly reduced. In addition, compared with the conventional denitrification process, by using a smaller reactor (reactor C), the space is saved, and it is convenient to control the temperature, pH and use amount during the biochemical treatment process. Accordingly, it is advantageous to simplify the operating steps, and the control cost can be significantly reduced.

(3) Only the resins adsorbed with nitrate nitrogen are denitrified. Moreover, the control conditions such as retention time and temperature are essential for denitrification. Accordingly, due to the significant reduction of the amount to be treated, the cost for controlling conditions such as temperature is significantly reduced.

(4) The resins can be recycled, thereby reducing the cost.

BRIEF DESCRIPTION OF THE DRAWINGS

FIG. 1 is a flowchart of a process for promoting denitrification to remove nitrate nitrogen in water by magnetic resins.

DETAILED DESCRIPTION OF THE INVENTION

The process for promoting denitrification to remove nitrate nitrogen in water by magnetic resins provided by the present invention will be further described by the following embodiments.

Embodiment 1

As shown in FIG. 1, the process for promoting denitrification to remove nitrate nitrogen in water by magnetic resins provided in this embodiment includes the following steps.

The concentration of nitrate nitrogen in sewage was 115 mg/L, and the sewage was treated by the following steps. (1) The sewage was fed into a pool A, and was then in contact with and mixed with magnetic anion exchange resins and non-magnetic anion exchange resins (Purolite®A520E), respectively, wherein the flow ratio of the resins to the water was 1:100 and the contact time was 40 min. The used magnetic anion exchange resins were strong base anion exchange resins formed by supporting nanoscale/microscale $Fe_3O_4$ on Purolite®A520E.

(2) The water from the pool A was treated by hydrocyclone separation (reactor B), 30% of the separated magnetic resins were returned to the pool A, and the remaining magnetic resins were put into a denitrification reactor (reactor C).

(3) Electron donors were added in the reactor C, the temperature was maintained at 35° C., and the magnetic resins were retained in the pool C for 5 h, wherein the electron donors were sodium acetate. At the start of the process, denitrifying bacteria was added in the reactor C.

(4) The magnetic resins on the bottom of the pool C were returned to the pool A for recycling by natural deposition.

The device continuously operated for 10 days, and the sewage was in contact with and mixed with the magnetic anion exchange resins. In the water finally discharged from the device, the removal rate of nitrate nitrogen was 95%±4%. When the sewage was in contact with and mixed with common strong base anion exchange resins (Purolite®A520E), the removal rate of nitrate nitrogen in the discharged water was only 83%±6%.

Embodiment 2

As shown in FIG. 1, the process for promoting denitrification to remove nitrate nitrogen in water by magnetic resins provided in this embodiment includes the following steps.

The concentration of nitrate nitrogen in sewage was 112 mg/L, and the sewage was treated by the following steps.

(1) The sewage was fed into a pool A, and was then in contact with and mixed with magnetic microsphere resins (the resins disclosed in Chinese Invention Patent 201110327637.8), wherein the flow ratio of the resins to the water was 1:200 and the contact time was 60 min.

(2) The water from the pool A was treated by hydrocyclone separation (reactor B), 20% of the separated magnetic resins were returned to the pool A, and the remaining magnetic resins were put into a denitrification reactor (reactor C).

(3) Electron donors were added in the reactor C, the temperature was maintained at 38° C., and the magnetic resins were retained in the pool C for 7 h, wherein the electron donors were glucose. At the start of the process, activated sludge was added in the reactor C.

(4) The magnetic resins on the bottom of the pool C were returned to the pool A for recycling by natural deposition.

The device continuously operated for 15 days, and the sewage was in contact with and mixed with the magnetic microsphere resins. In the water finally discharged from the device, the removal rate of nitrate nitrogen was 91%±2%.

Embodiment 3

As shown in FIG. 1, the process for promoting denitrification to remove nitrate nitrogen in water by magnetic resins provided in this embodiment includes the following steps.

The concentration of nitrate nitrogen in food wastewater was 82 mg/L, and the food wastewater was treated by the following steps.

(1) The food wastewater was fed into a pool A, and was then in contact with and mixed with magnetic acrylic strong base anion exchange microsphere resins (the resins disclosed in Chinese Invention Patent 201010017687.1), wherein the flow ratio of the resins to the water was 1:50 and the contact time was 45 min.

(2) The water from the pool A was treated by hydrocyclone separation (reactor B), 45% of the separated magnetic resins were returned to the pool A, and the remaining magnetic resins were put into a denitrification reactor (reactor C).

(3) Electron donors were added in the reactor C, the temperature was maintained at 30° C., and the magnetic resins were retained in the pool C for 8 h, wherein the electron donors were methanol. At the start of the process, anaerobic sludge was added in the reactor C.

(4) The magnetic resins on the bottom of the pool C were returned to the pool A for recycling by natural deposition.

The device continuously operated for 7 days, and the food wastewater was in contact with and mixed with the magnetic acrylic strong base anion exchange microsphere resins. In the water finally discharged from the device, the removal rate of nitrate nitrogen was 94%±3%.

Embodiment 4

As shown in FIG. 1, the process for promoting denitrification to remove nitrate nitrogen in water by magnetic resins provided in this embodiment includes the following steps.

The concentration of nitrate nitrogen in petrochemical wastewater was 45 mg/L, and the petrochemical wastewater was treated by the following steps.

(1) The petrochemical wastewater was fed into a pool A, and was then in contact with and mixed with magnetic strong base anion exchange resins (Song H, et al. Journal of Industrial & Engineering Chemistry, 2014, 20(5):2888-2894.), wherein the flow ratio of the resins to the water was 1:20 and the contact time was 10 min.

(2) The water from the pool A was treated by hydrocyclone separation (reactor B), 60% of the separated magnetic resins were returned to the pool A, and the remaining magnetic resins were put into a denitrification reactor (reactor C).

(3) Electron donors were added in the reactor C, the temperature was maintained at 20° C., and the magnetic resins were retained in the pool C for 1 h, wherein the electron donors were starch. At the start of the process, activated sludge was added in the reactor C.

(4) The magnetic resins on the bottom of the pool C were returned to the pool A for recycling by natural deposition.

The device continuously operated for 8 days, and the food wastewater was in contact with and mixed with the magnetic strong base anion exchange resins. In the water finally discharged from the device, the removal rate of nitrate nitrogen was 96%±2%.

Embodiment 5

As shown in FIG. 1, the process for promoting denitrification to remove nitrate nitrogen in water by magnetic resins provided in this embodiment includes the following steps.

The concentration of nitrate nitrogen in experimental water was 150 mg/L, and the experimental water was treated by the following steps.

(1) The experimental water was fed into a pool A, and was then in contact with and mixed with magnetic anion exchange resins (Wu Xuehui, et al. Journal of Guangxi University (Natural Science Edition), 1999, 24(2):163-166.), wherein the flow ratio of the resins to the water was 1:3 and the contact time was 5 min.

(2) The water from the pool A was treated by hydrocyclone separation (reactor B), 70% of the separated magnetic resins were returned to the pool A, and the remaining magnetic resins were put into a denitrification reactor (reactor C).

(3) Electron donors were added in the reactor C, the temperature was maintained at 18° C., and the magnetic resins were retained in the pool C for 0.5 h, wherein the electron donors were lactic acid. At the start of the process, denitrifying bacteria was added in the reactor C.

(4) The magnetic resins on the bottom of the pool C were returned to the pool A for recycling by natural deposition.

The device continuously operated for 7 days, and the experimental water was in contact with and mixed with the magnetic anion exchange resins. In the water finally discharged from the device, the removal rate of nitrate nitrogen was 87%±5%.

Embodiment 6

As shown in FIG. 1, the process for promoting denitrification to remove nitrate nitrogen in water by magnetic resins provided in this embodiment includes the following steps.

The concentration of nitrate nitrogen in food wastewater was 75 mg/L, and the food wastewater was treated by the following steps.

(1) The food wastewater was fed into a pool A, and was then in contact with and mixed with magnetic anion exchange resins, wherein the flow ratio of the resins to the water was 1:150 and the contact time was 50 min. The used magnetic resins were strong base anion exchange resins formed by supporting nanoscale/microscale $Fe_2O_3$ on Purolite®A520E.

(2) The water from the pool A was treated by hydrocyclone separation (reactor B), 5% of the separated magnetic resins were returned to the pool A, and the remaining magnetic resins were put into a denitrification reactor (reactor C).

(3) Electron donors were added in the reactor C, the temperature was maintained at 35° C., and the magnetic resins were retained in the pool C for 6.5 h, wherein the electron donors were sodium acetate and glucose. At the start of the process, activated sludge was added in the reactor C.

(4) The magnetic resins on the bottom of the pool C were returned to the pool A for recycling by natural deposition.

The device continuously operated for 12 days, and the food wastewater was in contact with and mixed with the magnetic anion exchange resins. In the water finally discharged from the device, the removal rate of nitrate nitrogen was 92%±2%.

Embodiment 7

As shown in FIG. 1, the process for promoting denitrification to remove nitrate nitrogen in water by magnetic resins provided in this embodiment includes the following steps.

The concentration of nitrate nitrogen in sewage was 68 mg/L, and the sewage was treated by the following steps.

(1) The sewage was fed into a pool A, and was then in contact with and mixed with magnetic anion exchange resins, wherein the flow ratio of the resins to the water was 1:80 and the contact time was 30 min. The used magnetic resins were magnetic strong base anion exchange resins prepared from macroporous anion exchange resins D201 by copolymerization.

(2) The water from the pool A was treated by hydrocyclone separation (reactor B), 10% of the separated magnetic resins were returned to the pool A, and the remaining magnetic resins were put into a denitrification reactor (reactor C).

(3) Electron donors were added in the reactor C, the temperature was maintained at 25° C., and the magnetic resins were retained in the pool C for 5.5 h, wherein the electron donors were ferrous sulfide. At the start of the process, denitrifying bacteria was added in the reactor C.

(4) The magnetic resins on the bottom of the pool C were returned to the pool A for recycling by natural deposition.

The device continuously operated for 9 days, and the sewage was in contact with and mixed with the magnetic anion exchange resins. In the water finally discharged from the device, the removal rate of nitrate nitrogen was 92%±2%.

Embodiment 8

As shown in FIG. 1, the process for promoting denitrification to remove nitrate nitrogen in water by magnetic resins provided in this embodiment includes the following steps.

The concentration of nitrate nitrogen in experimental water was 100 mg/L, and the experimental water was treated by the following steps.

(1) The experimental water was fed into a pool A, and was then in contact with and mixed with magnetic acrylic strong base anion exchange microsphere resins (the resins disclosed in Chinese Invention Patent 201010017687.1), wherein the flow ratio of the resins to the water was 1:60 and the contact time was 20 min.

(2) The water from the pool A was treated by hydrocyclone separation (reactor B), 35% of the separated magnetic resins were returned to the pool A, and the remaining magnetic resins were put into a denitrification reactor (reactor C).

(3) Electron donors were added in the reactor C, the temperature was maintained at 30° C., and the magnetic resins were retained in the pool C for 3.5 h, wherein the electron donors were sodium acetate, glucose and starch. At the start of the process, denitrifying bacteria and anaerobic sludge were added in the reactor C.

(4) The magnetic resins on the bottom of the pool C were returned to the pool A for recycling by natural deposition.

The device continuously operated for 10 days, and the experimental water was in contact with and mixed with the magnetic acrylic strong base anion exchange microsphere resins. In the water finally discharged from the device, the removal rate of nitrate nitrogen was 90%±3%.

Embodiment 9

As shown in FIG. 1, the process for promoting denitrification to remove nitrate nitrogen in water by magnetic resins provided in this embodiment includes the following steps.

The concentration of nitrate nitrogen in sewage was 92 mg/L, and the sewage was treated by the following steps.

(1) The sewage was fed into a pool A, and was then in contact with and mixed with magnetic strong base anion exchange resins (the resins disclosed in Journal of Industrial & Engineering Chemistry, 2014, 20(5):2888-2894.), wherein the flow ratio of the resins to the water was 1:30 and the contact time was 35 min.

(2) The water from the pool A was treated by hydrocyclone separation (reactor B), 50% of the separated magnetic resins were returned to the pool A, and the remaining magnetic resins were put into a denitrification reactor (reactor C).

(3) Electron donors were added in the reactor C, the temperature was maintained at 25° C., and the magnetic resins were retained in the pool C for 2 h, wherein the electron donors were divalent iron salt and ferrous sulfide. At the start of the process, activated sludge and anaerobic sludge were added in the reactor C.

(4) The magnetic resins on the bottom of the pool C were returned to the pool A for recycling by natural deposition.

The device continuously operated for 15 days, and the sewage was in contact with and mixed with the magnetic strong base anion exchange resins. In the water finally discharged from the device, the removal rate of nitrate nitrogen was 90%±3%.

Embodiment 10

As shown in FIG. 1, the process for promoting denitrification to remove nitrate nitrogen in water by magnetic resins provided in this embodiment includes the following steps.

The concentration of nitrate nitrogen in experimental water was 120 mg/L, and the test water was treated by the following steps.

(1) The experimental water was fed into a pool A, and was then in contact with and mixed with magnetic strong base anion exchange resins (the resins disclosed in Journal of Industrial & Engineering Chemistry, 2014, 20(5):2888-2894.), wherein the flow ratio of the resins to the water was 1:40 and the contact time was 50 min.

(2) The water from the pool A was treated by hydrocyclone separation (reactor B), 0% of the separated magnetic resins were returned to the pool A, and the remaining magnetic resins were put into a denitrification reactor (reactor C).

(3) Electron donors were added in the reactor C, the temperature was maintained at 15° C., and the magnetic resins were retained in the pool C for 3 h, wherein the electron donors were divalent iron salt and ferrous sulfide. At the start of the process, activated sludge and anaerobic sludge were added in the reactor C.

(4) The magnetic resins on the bottom of the pool C were returned to the pool A for recycling by natural deposition.

The device continuously operated for 13 days, and the sewage was in contact with and mixed with the magnetic strong base anion exchange resins. In the water finally discharged from the device, the removal rate of nitrate nitrogen was 88%±3%.

In the foregoing embodiments, the flow ratio is obtained by uniformly mixing a certain amount of water with the resins so that the resins become a fluid, i.e., a ratio of the volume of the resins to be fed into the reactor A per hour to the volume of sewage to be treated.

Other aspects involved in the present invention, which are not explained here, are the same as those in the prior art.

What is claimed is:

1. A method for promoting denitrification to remove nitrate nitrogen from water by magnetic resins, comprising the following steps of:
  (1) adsorption using the magnetic resins: feeding nitrate-laden wastewater into a vessel A, mixing the nitrate-laden wastewater with the magnetic resins in the vessel A, and removing nitrate nitrogen from the nitrate-laden wastewater by contacting the magnetic resins to the nitrate-laden wastewater for a period of time from 5 to 60 min, wherein the magnetic resins are anion exchange resins;
  (2) separation: passing the nitrate-laden waste-water from the vessel A into a reactor B wherein the magnetic resins are separated from the nitrate-laden wastewater by hydrocyclone separation, returning 0% to 70% of the separated magnetic resins to the vessel A, and putting the remaining magnetic resins into a denitrification reactor C;

(3) denitrification: adding electron donors to the reactor C, incubating the magnetic resins in the reactor C for 0.5 h to 8 h at the temperature from 15° C. to 38° C.; and (4) resin recycling: returning the magnetic resins on the bottom of the reactor C to the vessel A for recycling by gravitational setting.

2. The method according to claim 1, wherein, in step (1), the ratio of the magnetic resins to the nitrate-laden wastewater is 1:3-200 by volume.

3. The method according to claim 1, wherein, in step (1), the magnetic resins are nanoscale/microscale $Fe_3O_4$-supported strong base anion exchange resins, nanoscale/microscale $Fe_2O_3$-supported strong base anion exchange resins or magnetic strong base anion exchange resins prepared by copolymerization.

4. The method according to claim 1, wherein, in step (3), the electron donor is one or more selected from the group consisting of methanol, sodium acetate, glucose, starch, lactic acid, lactate, sulfur, divalent iron salt and ferrous sulfide.

5. The method according to claim 1, wherein a volatile solid is added to the reactor C, the volatile solid is one or more selected from the group consisting of activated sludge, denitrifying bacteria and anaerobic sludge.

6. The method according to claim 5, wherein the concentration of volatile solid is 0.1 to 20 g/L.

7. The method according to claim 1, wherein, in step (3), the electron donors are added in the reactor C in such an amount that the C/N ratio in a solution is 5.5 to 7.5.

8. The method according to claim 1, wherein, in step (3), incubating the magnetic resins in the reactor C for 1 hour at the temperature 30° C.

* * * * *